Oct. 31, 1933.　　　G. H. HARTMAN　　　1,932,780
GREASE GUN
Filed April 2, 1931
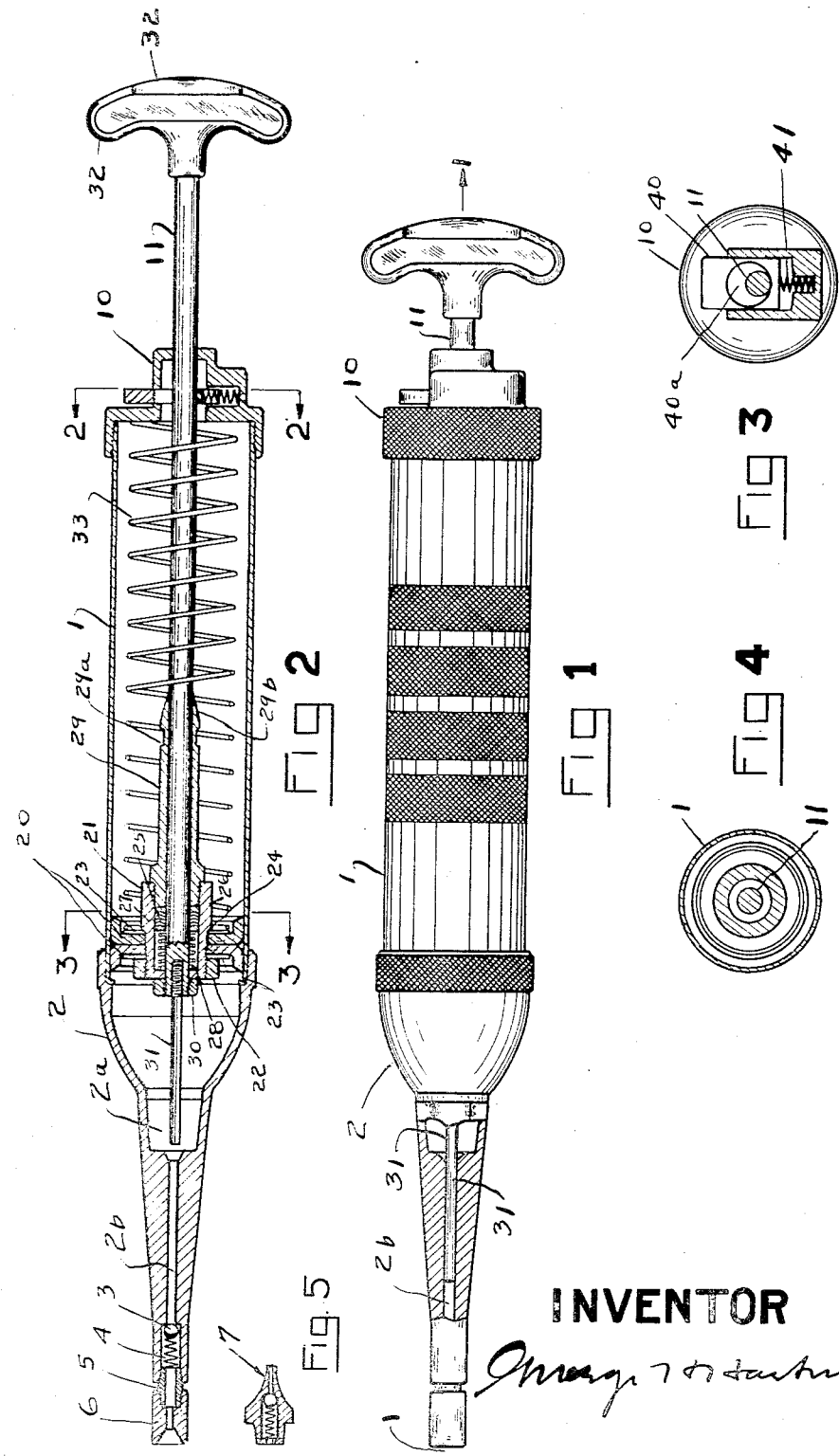
INVENTOR Patented Oct. 31, 1933

1,932,780

UNITED STATES PATENT OFFICE 1,932,780

GREASE GUN

George H. Hartman, Bryan, Ohio, assignor to The Aro Equipment Corporation, Bryan, Ohio, a corporation of Ohio Application April 2, 1931. Serial No. 527,165

3 Claims. (Cl. 221—47.4)

This invention relates to grease guns and in particular to hand guns that are used to force lubricant into bearings under pressure.

It will be understood by those familiar with the use of automobiles and accessories thereof that for lubricating bearings it is common to employ various greases, some of these are light in nature and tend to leak through various operating portions of the guns used to inject same into the bearings.

One object of my invention is to provide a hand grease gun whereby the grease is passed from a storage section into a small dispensing nozzle under one degree of pressure and passed from the nozzle into the bearings of the machine being lubricated at a different higher pressure.

Another object of my invention is to provide sealing means which will automatically seal the high pressure piston and which will prevent any grease disposed in the filled portion of the storage section from leaking back into the empty portion thereof. At the present time the guns of similar nature do not make provision for this sealing of the grease and the result is that after short periods of operation grease works around the high pressure piston to the back side of the follower pistons and the gun must be taken apart and cleaned.

Further objects and advantages of my invention are apparent from the following detailed description.

While the invention in its broader aspect is capable of embodiment in various forms, a preferred embodiment thereof, and of mechanism forming the same, are illustrated in the accompanying drawing in which:

Figure 1 is an outside view of the mechanism with portions removed and in section.

Figure 2 is a sectional view taken along the line 1—1 in Figure 1 with portions in a different operating position.

Figure 3 is a sectional view along the lines 2—2 in Figure 2.

Figure 4 is a sectional view along the lines 3—3 in Figure 2.

Figure 5 is a sectional view of a portion of a fitting provided in the bearing to be lubricated.

1 is a pump cylinder preferably formed of seamless steel tubing with each end threaded. At one end is screwed a delivery nozzle 2. The end of the nozzle 2 next the cylinder 1 tapers down to a smaller reduced diameter 2a at the point intermediate its ends. The opposite end of the nozzle is provided with a reduced diameter hole 2b. At the outer end of the nozzle 2 is a ball valve 3, held against its seat by a spring 4, the seat being formed by the enlarged diameter hole which holds the spring 4, the ball 3, and the outer end of hole 2b. Into this outer end of the nozzle 2 is screwed one end of a nipple 5, a fitting 6 being screwed onto the other end of the nipple 5. In operation the flared outer end of a fitting 6 is pressed over a fitting 7, (Figure 5) and grease internal of of the nozzle 2, is forced into the bearing through the fitting 7 which is screwed into the bearing being greased. This bearing is not here shown and the fitting 7 is not further shown or otherwise described as it is familiar and common to the art to which this invention appertains. The method of forcing grease through the nozzle 2 will be described hereinafter.

On the end of the tubing 1 opposite that end fitted with the nozzle 2 is a cap 10. Through the center of this cap passes an operating rod 11, the rod being guided for reciprocatory movement by the hole at the outer edge of the cap 10.

Internal of the tubing 1 and arranged for reciprocatory pumping movement therein are a pair of cup leathers 20. These cup leathers are clamped to a member 21 by a nut 22 between washers 23 and a shoulder 24 of the member 21 and the nut 22, the leathers and washers being clamped together by the tightening action of the nut 22 when screwed tightly on to the threads in the member 21. Internal of the member 21 is an enlarged bored out portion adapted to receive V leather packing 25, cup leather retainers 26 and 27 and a spring 28. One end of the internal enlarged portion of member 21 is threaded to receive a threaded end portion of a member 29. The opposite end of member 29 has a slot 29a and a tapered portion 29b. The further purpose of this member 29 will be as hereinafter more fully described.

Internal of the member 29 is a hole adapted to receive for reciprocatory movement therein the rod 11. This rod 11 is also adapted to pass through the V leather packing 25, the retainers 26 and 27 and the spring 28, into and through a bearing hole in the end of the member 21 opposite that end into which the member 29 is threaded.

The end of the rod 11 extending through the member 21, terminates at its outer portion in a threaded portion adapted to receive a nut 30 which serves as a stop means to prevent the rod 11 from being withdrawn from the members 21 and 29. Internal of this end of rod 11 is a threaded hole adapted to receive the threaded end of a piston 31, this piston 31 being of such diameter and size as will permit its passing into the hole 2b of the nozzle 2 with very small clearances. The further purpose of this piston 31 will be more fully described hereinafter.

At the end of the rod 11 opposite that end carrying the piston 31 is a handle 32. This handle is screwed on to this end of the rod and serves as a means of manually operating the rod as more completely described hereinafter.

Internal of the cylinder 1 is a coil spring 33. This spring 33 is provided to force the piston assembly formed of the cup leathers 20, the members 21 and 29 and associated parts downward toward the nozzle 2 so that grease which may be disposed between the nozzle 2 and the associated end of the piston assembly may be forced into the hole 2b of the nozzle 2. Grease then disposed in this hole 2b is acted upon by a downward manual reciprocatory movement of the rod 11, the piston 31 entering the hole 2b during this downward travel and driving the grease disposed internal of the hole 2b past the ball valve 3 into the fitting 6, and through the fitting 7 into the bearing being lubricated.

The operation of the device is as follows: The nozzle 2 is unscrewed from its associated end of the cylinder 1. The exposed open end of the cylinder is then inserted into the supply of grease or other oil which may be used and with one hand on the cylinder 1 and the other hand at the handle 32, the rod 11 is pulled back by the operator bringing the nut 30 into co-acting relation to the end of the member 21 as in Figure 2, continued pulling back on rod 11 pulling cup leathers 20 and the associated piston assembly back, compressing the spring 33. As this movement backward of the piston assembly will create a vacuum ahead of the cup leathers 20, atmospheric pressure on top of the cup leathers will cause the grease from the container to be pushed into this open end of the cylinder 1. During this movement of the rod 11, the member 29 and its associated slot 29a and the beveled end 29b are brought to the contact position with a lock bar 40 which is adapted for reciprocatory movement in a rectangular bearing contained internal of the cap 10. The bar 40 contains a hole 40a internal thereof. In the position shown in Figures 2 and 3, one edge of the hole 40a in the lock bar 40 is shown pressed against the rod 11 by a coil spring 41. As the tapered end 29b of the member 29 is pulled back into contact with this lock bar 40, the tapered edge engages in the hole 40a of the bar 40 and the bar is moved backwards compressing the spring 41 until the member 29 has reached a position to bring the slot 29a into such relation to the lock bar 40 that will permit the spring 41 to snap the edge of the hole 40a in the bar 40 into the slot 29a. The member 29 and its associated parts are now locked by the bar 40 to cap 10. The grease now disposed internal of the open end of the cylinder 1 will remain in the cylinder until the nozzle 2 is again screwed back into the position it normally holds on the end of the cylinder 1. As soon as the nozzle 2 is assembled back into position, the lock bar 40 can be pressed in manually, thus again compressing the spring 41, thereby releasing the edges of the hole in the bar 40 from contact with the edges of the slot 29a. The coil spring 33 is now free to expand, thus pressing the piston assembly composed of the cup leathers 20, etc. down on to the grease internal of the cylinder 1. This grease will be pressed into the small hole 2b of the nozzle 2 and the grease in the hole 2b is prevented from escaping from the end of nozzle 2 by reason of the check valve 3 and the spring 4.

It is evident that the tension in pounds per square inch on the spring 4 must be greater than the maximum pressure at any one point in pounds per square inch produced by the spring 33 on the grease in the cylinder 1.

The gun is now in position to be used and the operator will hold the flared outer end of the fitting 6 on the fitting 7 and press on the handle 32. The rod 11 will now slide through the members 21 and 29, the piston 31 will enter the hole 2b and grease disposed internal thereof will be forced out past the ball valve 3 into the fittings 6 and 7, and from them into the bearing which is not here shown.

It is evident that the small area of the piston 31 will permit of high pressure in pounds per square inch, as if this piston is $\tfrac{3}{16}''$ in diameter, the area will be .0276 square inches and that if the operator puts a pressure of 100 lbs. on the handle 32, the resultant pressure in pounds per square inch on the grease flowing past the check valve 3 will be 3,623 lbs. per square inch.

It is also evident that the pounds per square inch on the grease in the container due to the spring 33 is only nominal and sufficient only to cause the grease internal of the cylinder to flow into the hole 2b, at each time the piston 31 is removed from the hole 2b.

In Figure 2 I have shown the piston 31 in a position where the hole 2b can receive a charge of grease from the cylinder 1. In Figure 1 I have shown the handle 32 pressed down and the piston 31 is shown entered in the hole 2b.

It is evident that the pressure on the grease caused by the spring 33 will tend to cause the grease in the forward end of the cylinder 1 to creep past the free reciprocating rod 11 where it is journaled in the end of the member 21. To prevent this grease from leaking to the back side of the piston I have used V leather packings 25 pressed into contact with the shaft 11 by a spring 28. It is evident that this method of packing the rod 11 against leak of grease will prevent the grease from entering the emptied portion of the container and be automatically compensating for wear.

While this specification sets forth in detail the present and preferred construction of the gun, still in practice such deviations from such detail may be resorted to as do not form a departure from the spirit of the invention as defined by the appended claims.

Having thus described my invention what I claim as new and desire to secure by Letters Patent is:

1. In a grease gun, in combination a cylinder closed at one end by a removable cap, a second removable cap at the other end provided with a delivery duct, a piston in the cylinder having a central sleeve, a bearing extending into said sleeve, a spring urging the piston toward the delivery duct, a rod slidable through the first named cap, through the sleeve and through the bearing, the piston being provided with sealing means within the sleeve and abutting the bearing to prevent grease disposed internal of the cylinder at the delivery duct end thereof from passing through the piston and around the rod to the rear side of the piston as the piston is urged forward by the spring.

2. In a grease gun, a storage cylinder, a piston therein, a sleeve extending through said piston, a tubular guide extending from said sleeve and having an annular groove, a piston rod through said guide and sleeve and slidable relative thereto, packing means within said sleeve and surrounding said piston rod to prevent grease on one side of said piston from leaking to the other side thereof and latching means for said piston comprising a perforated latch bar receiving said rod and spring urged to eccentric position relative thereto, the edge of the perforation therein being adapted to coact with said annular groove.

3. In a grease gun, a storage cylinder, a spring urged piston therein, a retracting rod for said piston and means for latching said piston in retracted position comprising an extension on said piston having an annular groove, a latch bar having an opening therein larger than the diameter of said extension and surrounding said rod and means constraining said latch bar to position with said opening eccentric relative to said rod, said extension having a tapered end to enter said opening and force it toward concentric position to permit coaction thereof with said annular groove.

GEORGE H. HARTMAN.